United States Patent Office 3,381,705
Patented May 7, 1968

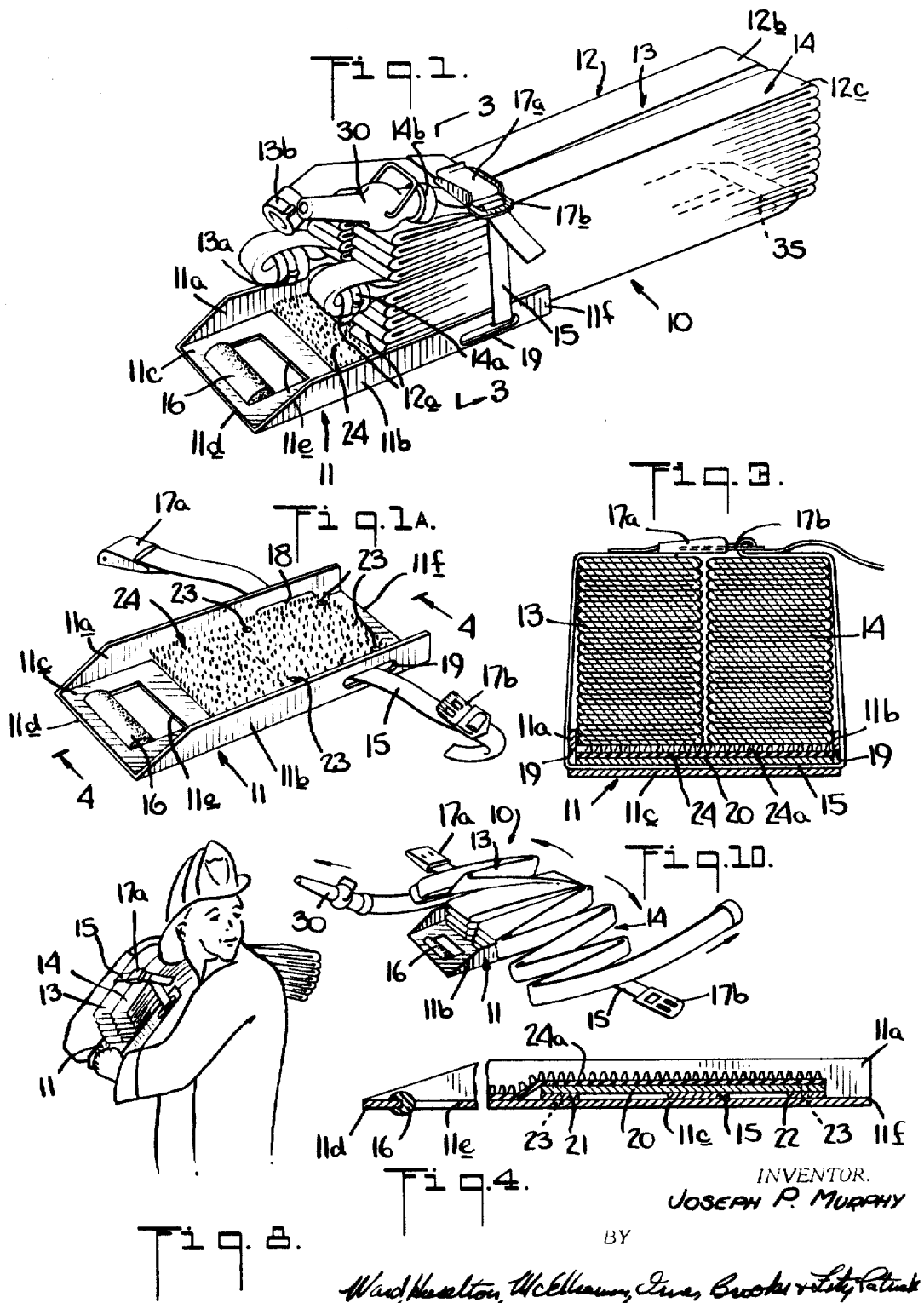

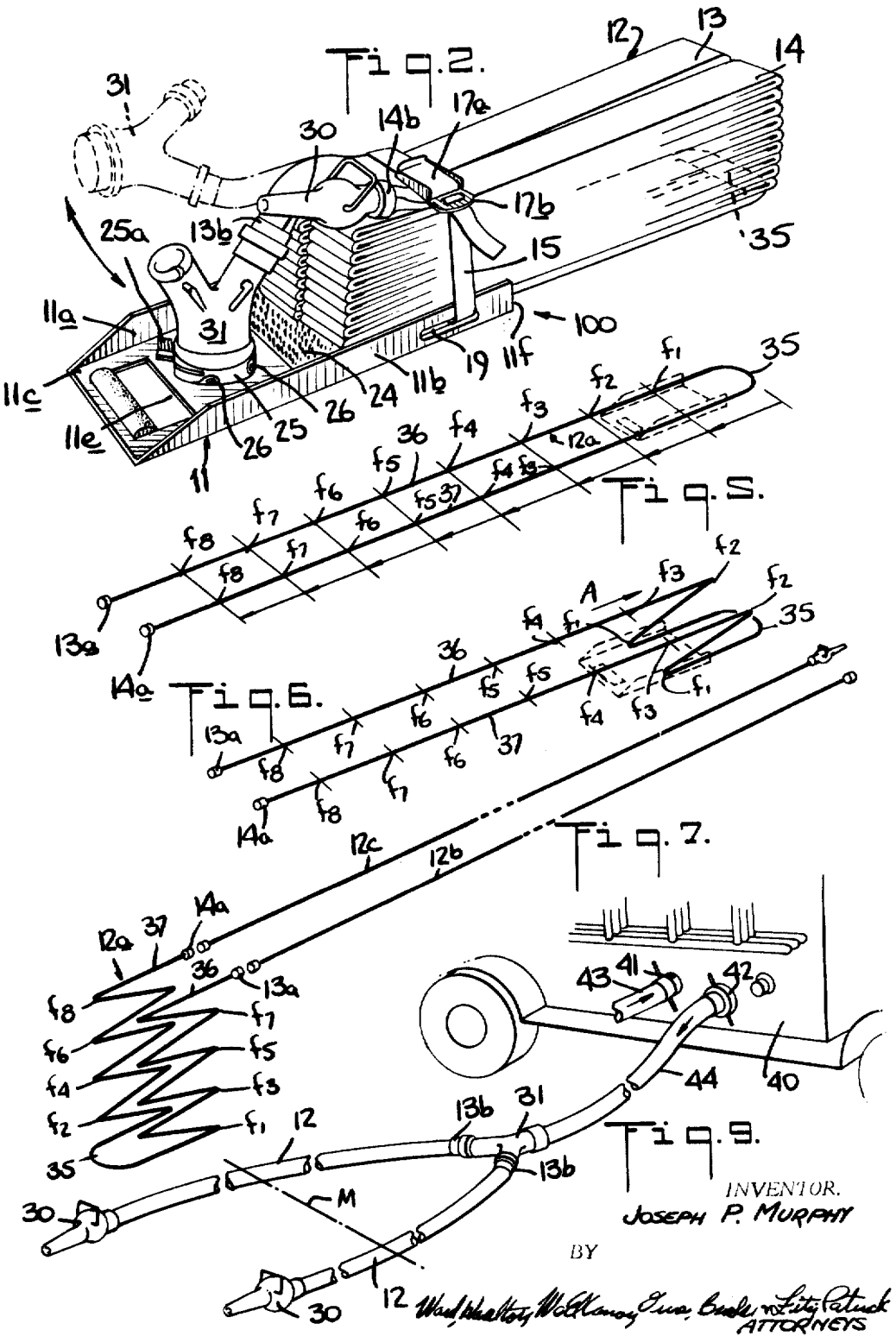

3,381,705
FOLDING AND PACKAGING OF
HOSE OR THE LIKE
Joseph P. Murphy, 25 Clarendon Place,
New Brunswick, N.J.
Filed Sept. 8, 1965, Ser. No. 485,680
17 Claims. (Cl. 137—355.28)

ABSTRACT OF THE DISCLOSURE

Coupled lengths of standard fire hose folded and stacked on handled tray; hose folded and stacked on tray in particular manner (see specification); belt having quick-release buckle holds hose stack on tray; tray has rubber mat providing slip-resistant bottom, and may have attached mount for releasably connecting standard Y-type hose coupling; so-formed hose package is used in particular manner (see specification).

Specification

In a conventional arrangement of the hose as used at the fire scene, a feeder line is connected between the fire hydrant and the pump inlet of the pumper truck, and the working hose extends towards the fire from its connection to the pump outlet of the truck. The working hose arrangement sometimes includes a relatively large diameter leader, formed from one or more hose length sections, having capacity to supply two nozzle lines of smaller diameter which are connected to the leader at a Y-type coupling, each nozzle line usually being formed of a number of connected hose length sections and the Y-type coupling being gated to control flow to the respective nozzle lines. As indicated, the leader line may sometimes be omitted, whereupon the two nozzle lines may be connected directly to the pump outlet of the truck by means of the same Y-type coupling. For fighting very small fires or for stand-by purposes after a major fire has been substantially extinguished, only one small diameter nozzle line may be used and the other nozzle line omitted. In still other instances where the distance between the pumper truck and the fire site is relatively short, it may be preferable that one or both of the nozzle lines be commensurately shortened by using fewer hose length sections when forming the same.

These and other alternate possibilities of preference in the makeup of the fire fighting hose at the scene of a fire lead to corresponding preferences or compromise when deciding how best to mount or store the hose on the hose truck in condition for immediate and effective unfurling, connecting and charging of the lines with water to commence actual fighting of the fire within the shortest possible time. That is, decisions which must be made include whether or not to pre-connect nozzle line or leader line sections; whether the leader line or the nozzle lines should be stored on top of the other considering the total footage of hose and space limitations; in what manner the hose line should be faked or furled on the hose bed of the truck for prompt removal or running out; the simplicity or complexity of the hose storage arrangement which permissibly might be used in view of the extent of experience and training of the firemen or bystanders who might be called upon to unfurl the same; and similar considerations.

For a better understanding of the invention, there follows a brief description of what are perhaps the best presently known solutions to the aforementioned problem of loading fire hose on a hose truck for subsequent efficient handling thereof at the scene of a fire.

In one arrangement of the hose on a hose truck, from one thousand to two thousand feet of 2½" diameter hose is loaded accordion style on the single compartment hose bed of the truck. The folded arrangement is such that the 2½" hose has a coupling disposed on the top of the load, and a 2½" x 1½" x 1½" gated Y-type valve coupling is connected thereto. Two 1½" diameter hose lines, each 150' in length and formed of three 50' connected hose sections, are coupled respectively to the remaining branches of the Y-type coupling, and each of the 1½" lines is folded in accordion style and placed on top of the 2½" hose load. With this arrangement, only one course of action is available at the scene of a fire. That is, after the truck has arrived at the scene, all of the 1½" hose and probably a considerable quantity of the 2½" hose must be removed prior to the truck proceeding to a fire hydrant dropping all of the remainder of the 2½" hose as a leader line. The 1½" hose lines are then advanced towards the fire from the street location at which they were taken from the truck. To conduct such a hose unloading operation efficiently requires much previous training on the part of firemen since considerable care must be taken to avoid entanglement of the hose lines and the resultant loss of time. In addition, this unloading technique results in extensive wear on the hose lengths themselves since an inordinate amount of dragging of the hose along streets and sidewalks is required.

A better type of hose loading arrangement involves the use of a divided hose bed on the truck, the hose bed then consisting of one large compartment for the 2½" hose and a smaller compartment for the two lengths of 1½" hose which is coupled to the 2½" hose in the same manner as the previous arrangement. The 2½" x 1½" x 1½" Y-type coupling is situated at the bottom of the two 1½" hose lines which are folded in accordion style in the smaller compartment, hose nozzles being connected to each of the respective 1½" lines and disposed on top of them. This arrangement permits the fire truck to approach the fire either directly or from the direction of the hydrant to which the hose will be connected, since either the 2½" line or the 1½" line may be first unloaded without interference with the other. However, even in this arrangement hose entanglement often results, especially in instances where well-meaning citizens attempt to help by pulling the hose from the truck. When such entanglement occurs, often the lines must be abandoned and new fire hose lines strung out.

Another technique provides for the carrying on the hose truck of the 1½" working hose lines in various connected lengths, but without pre-connecting the same to the 2½" leader, or coupling nozzles thereto, as previously described. This arrangement permits a choice of fittings and nozzles to suit the circumstances at the fire scene. Considerable training and maintenance of discipline among firemen are required where this arrangement is used since the supervisor must first determine which of the lines will be connected, etc. In some departments which employ this hose loading arrangement, firemen are trained to unload the hose from the truck by grabbing several folds thereof and walking in an instructed direction flaking the hose off their shoulders as they proceed. This hose flaking technique is considered difficult, and firemen seldom achieve real proficiency in attempting to practice the same. Moreover, should the fireman stumble as he proceeds, the hose which he is carrying on his shoulder usually becomes grossly entangled. As a result, when this method of unloading the hose from the truck is employed, most fire departments instruct their men to simply pull off and drag the hose to the location where it is to be used, whereupon the hose suffers a great deal of wear and tear.

The present invention provides apparatus and method for handling fire hose lines at the scene of a fire which is intended to supplement, and conceivably to replace, the presently available techniques as may be employed so that the forementioned problems of efficiency in stringing the hose from the hose truck to the fire, hose entanglement, and dragging of hose which promotes wear, are substantially eliminated. Moreover, using a hose package as will presently be described, the line may be strung properly and very easily even by substantially untrained personnel and, thus it is seen that reduced time in training firemen and organizing an efficient fire department is an indirect benefit of the invention. Moreover, by the present invention, only one man is required to unfurl the hose from the hose package so that confusion at the scene of a fire is reduced to a minimum. Further, tests have shown that the use of the present invention reduces dragging and resultant wear and tear on the hose by as much as 90%; eliminates possibility of snagging the hose line on parked automobiles, fence posts, and other obstructions; and reduces the time required to string fire hose between the hose truck and the fire by as much as 50%. Because of the reduced complexity of the hose package and the contemplated method of its use, it has been found that the oftentimes occurrence of a well-meaning citizen pulling fire lines in the wrong direction is virtually eliminated.

Briefly describing the invention, a portable hose package is formed by folding one or more hose length sections in a particular manner so as to facilitate unfolding of the same in a particular way, the folded hose being releasably secured to a light weight tray. In the preferred embodiment, the tray has particular features, including a slip-resistant surface, side walls, and a readily releasable buckle-type strap to assure retention of the folded hose on the tray, and a handle or the like to facilitate carrying of the hose package by a fireman. Further, it is contemplated that two forms of hose tray will be used in connection with any hose truck loading arrangement, the second form of tray being similar to the first, but having a releasable coupling mount attached thereto for temporary securement of the above referred to Y-type coupling which is conventionally coupled to the hose line. Although other sizes and lengths of hose may be used, in its preferred form the invention provides a hose package having three 50' sections of 1½" hose coupled together and folded and mounted on the hose tray in manner such that the hose couplings (or a hose coupling and a nozzle) at the respective ends of the total hose length are disposed at the top of the hose package.

The hose is folded in accordion fashion to provide a hose stack, of convenient length and height, which is positioned on the tray such that the carrying handle at one end of the tray is left exposed for use. In the preferred form of the invention the length of hose which is positioned on the tray is folded in a manner to provide a pair of parallel hose stacks situated in adjacent side-by-side relation on the tray, a U-shaped fold of the hose length being at the bottom of the pair at one end thereof. The relative lengths of the tray and the hose stack is such that one end of the hose stack, preferably though not necessarily being that at which the U-shaped fold is disposed where a pair of coextensive hose stacks is used, overhangs that end of the tray which is opposite the tray handle. This facilitates carrying of the hose package by a fireman, since only the relatively soft hose, rather than any part of the tray, need rest upon his shoulder, as will be more fully explained. When the hose stack is positioned on the tray the quick-release type buckle strap, which is attached to the tray, is brought around the hose stack and latched to hold the same firmly in place on the tray.

Where a Y-type coupling is pre-connected to one of the ends of the hose so as to be included in the hose package, the second form of hose tray is used, being that which has mounted thereon a quick-release type coupling mount for temporary securement of the relatively heavy and otherwise cumbersome Y-type coupling. The hose is stacked and releasably secured to the hose tray in the same manner as the first referred to tray form, excepting that the Y-type coupling is also releasably secured to the tray by coupling the same to the mount.

Although it may also be folded into a stack commensurately with its positioning on the tray, the hose may be first stacked in the manner to be described on any convenient layout floor and then carefully lifted and positioned on the tray, whereupon it is releasably secured thereto using the tray buckle strap. Assuming that a 50' hose length section is to be folded accordion fashion into a pair of parallel adjacent and coextensive stacks and positioned on the hose tray, the hose is first placed on the layout floor and folded in half to provide two equal and adjacently disposed length portions of 25' having a U-shaped fold therebetween. Considering that the U-shaped fold will be disposed at that end of the coextensive hose stacks which will overhang the tray and that both of the couplings at the respective ends of the hose will be disposed toward the opposite end of the coextensive stacks, an even number of equally spaced apart fold locations along each length portion is predetermined such that the hose stacks, when formed, will have convenient length. Thus, it is determined that, for example, each of the 25' length sections will have eight fold locations so as to provide a hose stack length of about 33" (considering that a few inches of hose length is absorbed by the U-shaped fold). Folding each length portion either independently of or commensurately with the other, the first fold location which is nearest the U-shaped fold is held against the layout floor to prevent its movement while the hose is lifted at the next, or penultimate fold location to be folded back upon itself at the first fold location, the penultimate fold location then overlying the U-shaped fold and being folded in opposite direction to the first. During the movement of the hose length portion, the third fold location will move into overlying relation with the first fold location, whereupon the folding procedure is repeated. That is, the hose is lifted at the fourth fold location to move the same into overlying relation with respect to the above referred to penultimate fold location while holding the hose at the intermediate third fold location to permit a fold in the first, or upward direction to form at the latter. The procedure is repeated twice more, lifting the hose at the sixth and then the eighth fold locations while holding the hose against lifting at the fifth and seventh fold locations, respectively, whereupon it will be found that the hose coupling or nozzle, as the case may be, at the free end of each hose length portion is situated at the end of the stack which is opposite that end at which the U-shaped fold appears. The continuous length of hose to be carried in the package may be made larger by coupling an additional hose length section to each of the hose length portions of the now folded hose section and continuing the folding in the same manner with the result that the height of the pair of hose stacks is increased. The thus folded hose is then secured to the hose tray as previously mentioned, and the hose package is ready for use.

At the scene of a fire, the hose package is manually transported to a location midway between the points between which the unfurled hose is to extend, and the package set upon the ground with the hose stack facing upwardly. The buckle strap of the package is released, and the hose in the first of the pair of stacks may be promptly strung out in one direction while the hose in the second stack is strung out in the opposite direction by merely grasping the respective free ends of the hose length portions and moving the same in the respectively desired directions. Actually, the respective hose stacks tend to fall outwardly towards the respective opposite sides of the tray when the tray buckle is uncoupled, and this has been found to afford additional advantage towards effectively unfurling and promptly stringing the hose line.

These and other objects, features and advantages of the invention will become more fully apparent from the following detailed description of the invention, when taken together with the accompanying drawings in which:

FIGURE 1 is a perspective showing of a hose package in accordance with the invention; FIGURE 1A is a similar showing of only the hose tray which forms a part of the package illustrated in FIGURE 1;

FIGURE 2 is a perspective showing of a second form of hose package which will ordinarily accompany the hose package of FIGURE 1 in any given application;

FIGURE 3 is a cross-sectional view, to a somewhat enlarged scale, through the hose package of FIGURE 1 as seen from lines 3—3 in FIGURE 1;

FIGURE 4 is a fragmentary cross-sectional view, to the scale of FIGURE 3, of the hose tray of FIGURE 1A as seen from lines 4—4 of that figure;

FIGURES 5, 6 and 7 are somewhat diagrammatic perspective illustrations, to a greatly reduced scale, of the manner, and showing the sequence in which a length of hose is folded and positioned on a hose tray;

FIGURE 8 illustrates the manner in which a portable hose package in accordance with the invention is carried by a fireman;

FIGURE 9 is a fragmentary perspective showing of a desirable arrangement of hose lines as attached and extending from a pumper type fire truck, and as may be conveniently assembled using the present invention; and FIGURE 10 is a somewhat diagrammatic illustration of the manner in which the hose in the package of FIGURE 1 is unfurled.

Referring first to FIGURE 1, a hose package in accordance with the invention is generally indicated by reference numeral 10. The hose package 10 includes a hose tray, generally indicated by reference numeral 11, of light weight material such as aluminum. A length of fire hose 12 is folded in accordion fashion as will be described to provide a pair of parallel and coextensive hose stacks 13, 14 which are tightly but releasably secured to the tray by the releasable buckle strap 15 of the latter. As will be hereinafter described in greater detail, the overall length of the hose 12 which is included in the hose package 10 is formed from three hose length sections 12a, 12b and 12c, each 50′ in length, making a total hose length of 150′. The hose stack 13 is formed by half of the bottommost hose length section 12a plus the hose length section 12b, the two being coupled together at the coupling 13a. The free end of the hose length section 12b at the top of the hose stack 13 has a standard hose coupling 13b attached thereto. The hose stack 14 is formed by the other half of the bottommost hose length section 12a plus the hose length section 12c, the two being coupled together at the coupling 14a. A conventional hose nozzle 30 is attached to the hose coupling 14b at the otherwise free end of the hose length section 12c which is at the top of the stack 14.

As most clearly shown in FIGURE 3, the width of the hose tray 11 between its upturned side walls 11a, 11b is substantially equal to the overall width of the adjacently situated hose stacks 13, 14. Of course, it will be understood that only a single stack of hose might be mounted on the tray, in which event the width of the tray would be substantially equal to the width of the single hose stack. In the embodiment being described, the hose 12 is standard 1½″ diameter fire hose and, thus, considering that the hose itself when flattened has width of about 3″, the inside width of the tray 11 between its side walls 11a, 11b is substantially 6″. To facilitate carrying of the hose package in manner as will be described, the length of the hose tray 11 as shown in FIGURE 1 is 18″.

Referring to FIGURES 1A, 3 and 4, the hose tray 11 is preferably formed from an elongated flat sheet of metal material by folding a pair of side walls 11a, 11b upwardly from a flat base portion 11c having the desired width. In the illustrated embodiment, the height of each side wall 11a, 11b is about 1½″. Of course, the tray might also be made of plastic, or the like, in which case other forming methods might be employed. Adjacent one tray end 11d, a cut out 11e is formed to provide a handle for carrying the tray, a smoothly rounded handle grip 16 of wood or plastic or the like being provided along the carrying edge to protect the hand against the somewhat small thickness of the material of the bottom 11c to which the hand would otherwise be exposed. Further to facilitate carrying, each side wall 11a, 11b is chamfered in the vicinity of the handle at the tray end 11d, as shown.

Since as seen in FIGURE 1 only a portion of the length of the pair of hose stacks 13, 14 will be situated on the tray 11, the buckle strap 15 is attached to the tray near its opposite end 11f. In the form illustrated, the centerline of the strap 15 is located about 5″ away from the tray end 11f. The strap 15 is flexible, being formed of strong material, such as woven fabric, leather or the like, and has a quick-release type buckle 17a, 17b attached thereto as most clearly shown in FIGURE 1A. The latch portion 17a of the buckle is preferably of the liftable-release type so as to effect unencumbered release of the buckle insert member 17b.

The strap 15 is continuous, and extends through the slots 18, 19 which are formed respectively through the tray side walls 11a, 11b. The lowermost edges of the slots 18, 19 lie within the plane of the top surface of the tray bottom 11c, as best seen in FIGURE 3. As shown in FIGURE 4, the strap 15 passes under a bottom plate 20 of the tray, spacers 21, 22 being disposed between the plate 20 and the tray bottom 11c at the respective sides of the strap 15 to provide clearance for the strap. The plate 20 and spacers 21, 22 are attached to the tray bottom 11c, as by four screws 23, the height of the spacers 21, 22 being such that the plate 20 exerts pressure on the strap 15 to hold the latter firmly in place. Slip resistant material 24, such as a sheet of rubber mat material having closely spaced protuberances 24a on its surface as illustrated, is adhesively secured to the tray bottom 11c along that portion of its length, including the bottom plate 20, upon which the hose stacks 13, 14 will rest. Thus, the spacing of the upturned side walls 11a, 11b of the tray, and the slip resistant material 24 at the bottom of the tray, tend to hold the hose stacks 13, 14 in vertical position and prevent their slippage from under the buckle strap 15 when the hose is mounted on the tray and the hose package is carried.

The modified form of hose package 100 as illustrated in FIGURE 2 is identical to the hose package 10 of the FIGURE 1 embodiment, excepting that the length of the hose tray 11 is made 6″ longer in the area between the handle opening 11e and the edge of the slip resistant material 24 which faces the handle end of the tray, as will be understood from the drawings, the longer total length of 24″ being for the purpose of accommodating a coupling mount 25 which is attached to the tray bottom 11c, as by screws 26. In addition, the continuous length of hose 12 includes a conventional hose nozzle 30 at one of its free ends atop the hose stack 14, and a conventional 2½″ x 1½″ x 1½″ gated Y-type coupling 31 coupled to the coupling 13b at the other of its free ends atop the hose stack 13, as shown. After the hose 12 is folded and secured to the hose tray 11, the 2½″ diameter opening of the Y-type coupling 31 is releasably mounted on the coupling mount 25, as indicated by the full line showing of the drawing, so that the coupling 31 is secured against erratic movement as would otherwise be the case during carrying of the hose package 100. Thus, the hose package 100 includes a hose tray 11 of somewhat longer length, the tray having side walls 11a, 11b; a flexible strap 15 provided with a buckle 17 and attached to the tray in the same manner as described in connection with the tray of FIGURES 1, 1A, 3 and 4; and slip resistant material 24 adhesively secured to the tray bottom 11c.

Although not illustrated in detail, the coupling mount 25 is of any conventional type, such as that which is sold under the trademark Tri-Loc. The mount 25 includes a spring biased lever 25a for manual releasing of three upwardly projecting and radially outward operating jaws (not shown) which are normally in position to grip the inner surface of the 2½" diameter opening of the coupling 31 to hold the latter on the mount. Operation of the lever 25a against its spring bias causes the jaws to retract and release the coupling 31, whereupon the coupling 31 may be lifted off the mount 25, as indicated by the dotted line showing in FIGURE 2.

Referring now to the manner in which a length of hose 12 is folded for mounting on the hose tray 11 in the embodiment of either FIGURE 1 or 2, attention is directed to FIGURES 5 and 6 of the drawings. The folding procedure will be described using a standard 50' hose length section 12a of 1½" diameter hose having hose couplings 13a, 14a at the respective terminal ends thereof. Referring to FIGURE 5, the sectional length of hose is first folded in half to provide a U-shaped fold 35 and two equal length portions 36 and 37 extending in parallel, side-by-side relation from the U-shaped fold 35. That is, each of the length portions 36, 37 is about 25' in length, considering that a few inches of the total hose length is absorbed by the U-shaped fold 35. Although FIGURES 5 and 6 diagrammatically show the hose length portions 36 and 37 in somewhat spaced apart relation, it will be understood that, as illustrated by FIGURE 3, the hose length portions 36, 37 are actually immediately adjacent one another. Considering that the overall length of the hose package 10 or 100 should be a convenient length for carrying and handling, and that the hose stacks to be formed from the length portions 36 and 37 will overhang the tray end 11f in the ultimately formed hose package and, further, that it is preferable that the free ends of the hose length section 12a be secured by the buckle strap 15 in the package as finally formed, a number of fold locations along each of the length portions 36, 37 are predetermined such that the hose stacks 13, 14 will ultimately appear as shown in either FIGURE 1 or 2. In the example shown by FIGURE 5, eight fold locations, equally spaced approximately 33" one from the other, have been selected to ultimately provide a pair of coextensive and adjacently disposed hose stacks having overall length of 33". The adjacent fold locations along each length portion 36, 37 are identified by reference numerals $f_1$ through $f_8$, inclusive. Each of the hose length portions 36, 37 will be folded in accordion fashion, in direction perpendicular to the direction of fold of the U-shaped fold 35, to respectively provide the hose stacks 13, 14 in manner as will now be described.

Referring to FIGURE 6 which for clarity illustrates only the first steps in the stack-forming procedure, each of the hose length portions 36, 37 is held against lifting movement at the respective fold locations $f_1$, these being the fold locations nearest the U-shaped fold 35, while the hose length portions 36 and 37 are lifted at the respective penultimate fold locations $f_2$ and moved, in the direction of arrow A, until the fold locations $f_2$ overlie the U-shaped fold 35. It will be noted that a fold in one direction will automatically form at the fold locations $f_1$, while a fold in the opposite direction will automatically form at the respective fold locations $f_2$ during the lifting and moving of the hose portions 36, 37. In each hose length portion 36 or 37, these alternately reversed directions of fold occur within a plane which is vertically disposed with respect to the horizontal plane of the U-shaped fold 35. It will also be noted that the fold location $f_3$ will have been brought into overlying relation with respect to the fold location $f_1$.

The described folding procedure is repeated until the hose length portions 36, 37 have been folded to form the respective hose stacks 13, 14, as indicated by the thus folded hose length section 12a as illustrated in FIGURE 7. That is, and referring again to FIGURE 6, each hose length portion 36, 37 is held at the respective fold locations $f_3$ (which are now in overlying relation with respect to fold locations $f_1$) while each hose length portion is lifted at the respective fold locations $f_4$ and again moved in the direction of arrow A until the fold locations $f_4$ overlie the previously folded fold locations $f_2$, and it will be noted that the fold locations $f_5$ now overlie the respective fold locations $f_3$. Then, holding each of the length portions 36, 37 against lifting at the respective fold locations $f_5$, the respective fold locations $f_6$ are lifted and brought into overlying relation with respect to the fold locations $f_4$, whereupon fold locations $f_7$ will overlie the fold locations $f_5$. Holding the length portions 36, 37 at their respective fold locations $f_7$, the last folding is made by moving the respective fold locations $f_8$ into overlying relation with respect to fold locations $f_6$, and it will be noted that the respective hose couplings 13a, 14a will then be disposed at the top of the thus formed coextensive hose stacks 13, 14 at that end of the hose stacks which is opposite the end at which the U-shaped fold 35 is disposed.

Maintaining the folded hose stacks 13, 14 in their parallel adjacent relation, the hose may then be positioned on the hose tray 11 and releasably secured thereto by the buckle strap 15, as previously explained. Alternatively, and as indicated in FIGURE 7, an additional 50' hose length section may be coupled to each of the couplings 13a, 14a of the thus folded hose length section 12a to increase the quantity of hose in the ultimately formed hose package. That is, and referring to FIGURE 7, additional hose length sections 12b, 12c may be coupled to the respective couplings 13a, 14a of the folded hose length section 12a, whereupon the appropriate fold locations along each of the sections are determined, and each of the hose sections 12b, 12c is folded in accordion fashion as has been described in connection with the portions 36, 37 of the hose length section 12a. Preferably, the folding of the sections 12b, 12c is conducted prior to the time when the folded hose is mounted on the hose tray 11. Where such additional sections are included, the ultimately formed hose package will appear as shown in FIGURE 1, the couplings 13a, 14a protruding from a common end of their respective stacks, and the free ends of the hose length sections 12b, 12c being disposed at the top of each stack and at the same end thereof.

Referring now to FIGURE 9, which illustrates a desirable arrangement of fire hose as strung between a pumper type fire truck 40 and the scene of a fire, the manner of using the hose packages 10 and 100 will now be explained.

The pumper truck 40 has a water inlet coupling 41 and a water outlet coupling 42. A length of hose 43 serves as a feeder line feeding water from a fire hydrant (not shown) to the inlet side of the truck pump (situated within the truck and therefore not shown), via the inlet coupling 41. The pumped water emerges from the truck 40 at the outlet coupling 42 to which the working lines 44, 12, 12 are coupled. A 2½" diameter leader hose line 44 is coupled to the outlet coupling 42, as shown, and leads the water, via the 2½" x 1½" x 1½" gated Y-type hose coupling 31 which is coupled to its opposite end, to the pair of 1½" diameter hose lines 12 which serve as nozzle lines in fighting a fire. As previously mentioned, the overall length of either the leader line 44 or either of the nozzle lines 12 may be formed of one or more standard hose length sections coupled together. Of the hose in the working hose arrangement 44, 12, 12, it is the hose lines 12, 12 which have been previously described as having been stacked and secured to the hose trays 11 (not shown in FIGURE 9) prior to being unfurled and connected in the manner illustrated by FIGURE 9. Of course, it will be understood that all, or a portion of the leader hose line 44 might be packaged on a hose tray in similar manner. In any event, the truck 40 is previously loaded at the fire station with the appropriate number of hose packages 10 and 100 as will be required to form the hose arrangement as shown in FIGURE 9.

When the truck 40 arrives at the scene of a fire, it may be found to have approached the same from the direction of the fire hydrant (not shown), or from the direction of the fire, or the truck may first arrive at an intermediate location. Regardless of the direction of approach, the truck 40 will ultimately proceed to a location near the hydrant so that its relatively short feeder line 43 may be strung between the hydrant and the pump inlet 41. If the distance between the actual fire site and the hydrant is far, the truck may make a brief intermediate stop to permit firemen to take from the truck at least the hose packages which will form both nozzle lines 12, and perhaps to unload at least a portion of the 2½″ leader line 44 which is either in packaged form or merely folded in accordion fashion on one of the hose beds (not shown) of the truck.

Assuming that one of the nozzle lines 12 is packaged in the form of the hose package 10 of FIGURE 1, and that the other line 12 is packaged in the form of hose package 100 of FIGURE 2 to include the Y-type coupling 31, one fireman will remove the hose package 10 from the truck 40 and carry the same on his shoulder in the manner illustrated in FIGURE 8, and a second fireman will similarly remove and carry the hose package 100, to a location M (FIGURE 9), which is a distance from the ultimately desired location of the nozzles 30 equal to half the total length of the hose within the respective packages 10 and 100. That is, if each package 10 and 100 contains 150′ of 1½″ diameter hose, both hose packages 10, 100 will be carried and set on the ground at a distance of 75′ from the desired locations of the nozzles 30 when fighting the fire. In the meantime, the 2½″ leader line 44 is being strung out between the truck 40 (which may now be proceeding to the hydrant site) and a location of one of its ends about 75′ behind the locations M so that the nozzle lines 12 may be coupled thereto via the Y-type coupling contained in the hose package 100.

The manner in which the hose 12 is unfurled from the hose packages 10 and 100 is illustrated in FIGURE 10 wherein the package 10 is shown resting upon the ground. Its buckle strap 15 is promptly released by lifting the buckle latch 17a, whereupon the hose stacks 13, 14 tend to respectively fall in lateral direction from the tray 11. In any event, the hose coupling 13b is free to be grasped by a fireman and carried back towards the leader line 44, and the nozzle 30 is free to be immediately carried towards the fire site. The hose package 100 is similarly opened by releasing its buckle strap 15 and by also operating the mount release lever 25a (FIGURE 2) to release the Y-type coupling 31, which is included in that package and which is then free to be carried to the location of the free end of the leader line 44 to be coupled thereto. Of course, the hose coupling 13b of the hose line from the package 10 is promptly coupled to the second 1½″ diameter opening of the Y-type coupling 31 as both of the lines 12 are then connected to the leader line 44, and it will be understood that as soon as these connections have been made and both nozzles 30 are under control, the working hose arrangement 44, 12, 12 is ready for immediate charging with water.

Perhaps it should be noted that an advantage of the present invention is that all of the hose in either of the packages 10 or 100 need not be fully unfurled prior to charging the hose lines with water. That is, after the hose package is placed upon the ground and its buckle strap 15 released, the opposite ends of the hose need not be carried away from each other a distance whereby all of the pleats of the respective hose stacks 13, 14 are unfurled but, rather, the distance that the ends of the hose are carried away from each other may be shorter so that the quantity of unfurled hose, adjacent the tray, initially provides considerable slack in the line to be taken up later as, for example, when the hose nozzle 30 is progressively hauled closer to the fire during the firefighting operation. When the hose line 12 is initially charged in this slackened condition, the surge of water will cause the remaining furls of hose adjacent the tray to "accordion out," and it will be noted that this can occur in the hose line as packaged in accordance with the present invention because of the alternately opposite disposition of adjacent folds of the hose line. Moreover, because the respective hose stacks 13, 14 have a tendency to fall laterally to the ground as soon as the buckle strap 15 is released, such sideways falling being possible in view of the relatively short height of the respective side walls 11a, 11b of the tray, it will be noted that the hose line 12 upon charging will tend to spring outwardly in the horizontal plane, more so than in vertical direction. Such lateral springing apart of the hose upon charging is considered safer than a springing apart of the hose in vertical direction as might occur in conventional operations where a central length portion of the hose line remains in vertically stacked condition on the hose bed of a fire truck when the line is charged.

Thus has been described a folding and packaging of hose which achieves all of the objects of the invention.

What is claimed is:

1. The method of folding a sectional length of fire hose and packaging the same on a tray, said hose length having hose coupling means at each of its respective ends, comprising the steps of folding said length at a fold location substantially half-way between its said ends to provide a substantially U-shaped fold and two length portions extending in side-by-side parallel relation from said U-shaped fold, then predetermining an even number of fold locations sequentially numbered from said U-shaped fold for reference purposes and equally spaced apart along the length of each said length portion and between said U-shaped fold and said hose coupling means at the end thereof, the number of said fold locations along each of said length portions being equal and said fold locations along one of said length portions being respectively adjacent to said fold locations along the other, then folding each said length portion back upon itself in alternately reversed direction at said fold locations by lifting said length portion, in direction perpendicular to the plane of said U-shaped fold, at the respective of the even numbered of said fold locations, and moving each of said lifted fold locations into sequentially overlying relation with said U-shaped fold and with each other while holding the odd numbered of said fold locations substantially against lifting but while permitting all but the first of said odd numbered fold locations to move laterally into sequentially overlying relation with each other, whereby both said length portions together provide a pair of coextensive hose stacks disposed in parallel, side-by-side relation, each said hose stack having one of said hose coupling means at the top thereof and situated at that end of the stack which is formed by said overlying odd numbered fold locations, positioning said hose stacks on a tray, and releasably securing said hose stacks to said tray whereby said folded condition of each hose stack is maintained.

2. A portable fire hose package comprising a substantially flat and open tray having opposite ends, foldable fire hose folded in accordion fashion to provide a hose stack positioned on said tray and overhanging one of said ends of the tray, said hose stack extending upwardly from, and being substantially entirely exposed above the plane of said tray and said hose including a terminal length portion extending along the top of said hose stack, and releasable strap means attached to said tray and extending transversely over the top of said hose stack from one side of said tray to the other for holding said hose stack in said position on said tray, said tray having means providing a slip-resistant surface for resisting hose slippage disposed along at least a portion of its length underlying said hose stack.

3. A hose package according to claim 2 wherein said terminal length portion of said hose extends along the top of said hose stack and downwardly therebeyond towards said tray, and has a fire hose end coupling attached thereto and connected to said tray.

4. A hose package according to claim 2 wherein the other of said tray ends has handle means projecting outwardly of said hose stack.

5. A hose package comprising a tray, foldable hose including two length portions each folded in accordion fashion to provide a pair of coextensive hose stacks in parallel adjacent relation positioned on said tray, both of said hose stacks extending upwardly from the plane of said tray and each said hose length portion having a terminal end portion extending along the top of its associated hose stack, said hose further including a substantially U-shaped fold between its said two length portions, and releasable means for holding said hose stacks in said position on said tray.

6. A hose package according to claim 5 wherein said tray has width which is substantially equal to the total of the widths of said adjacent hose stacks.

7. A hose package according to claim 6 wherein said tray further has upwardly projecting side wall means respectively adjacent the opposite sides of said pair of hose stacks.

8. A hose package according to claim 5 wherein said tray has opposite ends, a common end of said coextensive hose stacks overhangs one of said ends of the tray, and said U-shaped fold is disposed at said common end of the hose stacks.

9. A hose package according to claim 5 wherein said tray has opposite ends, a common end of said coextensive hose stacks overhangs one of said ends of the tray, and each said terminal end portion includes hose coupling means positioned substantially adjacent to the opposite end of said coextensive hose stacks.

10. A hose package according to claim 9 wherein the opposite end of said tray has handle means, said opposite end of said coextensive hose stacks being positioned on said tray in spaced relation with respect to said tray handle means, and said tray further includes a coupling mount attached thereto between its said handle means and said positioning of said opposite end of the coextensive hose stacks, one of said coupling means including a Y-type coupling mounted on said coupling mount.

11. A hose package according to claim 9 wherein one of said coupling means has a nozzle connected thereto.

12. A substantially flat and open tray for portably packaging fire hose, comprising an elongated bottom having opposite ends and opposite sides, handle means on one of said ends, and releasable hose securing means extending between said sides, said bottom having means for resisting hose slippage disposed along at least a portion of its length including an area thereof substantially adjacent said hose securing means.

13. A tray according to claim 12 wherein said hose securing means comprises a strap extending transversely of and across said bottom, said strap having free ends extending outwardly of said sides of the tray and including releasable buckle means for connecting said free ends together, and said bottom has spaced apart plate means attached thereto at respective locations at opposite sides of said strap, said plate means including means providing a substantially rigid bridge portion spanning across said strap.

14. A tray according to claim 12 wherein each said side thereof comprises means defining an elongated wall projecting substantially perpendicular to the plane of said bottom, and said releasable hose securing means comprises a pair of strap portions respectively projecting outwardly of said side walls and including quick-release type buckle means for releasably connecting said strap portions together.

15. A substantially flat and open tray for portably packaging fire hose, comprising an elongated bottom having opposite ends and opposite sides, handle means on one of said ends, and releasable hose securing means extending between said sides, said bottom having a releasable fire hose coupling mount means attached thereto adjacent said handle means.

16. A method of laying a length of fire hose line between a water source and a site to which the hose line is intended to convey water, comprising the steps of carrying said hose line in packaged form to a location between said water source and said site, said packaged form of hose line comprising a length of furled fire hose mounted on a tray and being secured against unfurling by releasable means, said furled length of hose having respective terminal ends, then setting said packaged form of hose line on the ground at said location and releasing said releasable means, then transporting one of said terminal ends of the hose line towards said site and the other of said terminal ends of the hose line towards said water source, and connecting the last said terminal end of the hose line to said water source.

17. A method of laying fire hose between a water source and a site to which the hose is intended to convey water, comprising the steps of carrying two hose lines of small diameter hose in separately packaged form to respective locations between said water source and said site, each said packaged form of hose comprising a pair of coextensive hose stacks in parallel, side-by-side relation and secured together by releasable means, each said hose stack of the pair including one of the terminal ends of the hose line at its top, one of said terminal ends on a first of said two packaged forms of hose line having one of the upper branches of a Y-type hose coupling connected thereto, then setting both of said packaged forms of hose on the ground at said respective locations and releasing said releasable means of each said packaged form of hose, then transporting and connecting one of said terminal ends of the second said packaged form of hose to the other upper branch of said Y-type hose coupling and transporting and connecting the bottom branch of said Y-type hose coupling to said water source, and transporting the remaining terminal ends of both said packaged forms of hose towards said site.

References Cited

UNITED STATES PATENTS

| | | | |
|---|---|---|---|
| 513,265 | 1/1894 | Hunter | 137—355.28 X |
| 1,360,436 | 11/1920 | Owen | 137—355.28 X |
| 1,756,874 | 4/1930 | Monto | 137—355.28 X |
| 2,367,141 | 1/1945 | Rosenblum | 137—355.28 X |
| 2,384,395 | 9/1945 | Payne | 270—61 X |
| 2,480,764 | 8/1949 | Pennington | 221—185 X |
| 2,557,385 | 6/1951 | Lee | 137—355.28 X |
| 2,780,430 | 2/1957 | Pokryfke | 137—355.28 X |
| 2,871,083 | 1/1959 | Pokryfke | 137—355.28 X |
| 2,912,151 | 11/1959 | Crabs | 224—50 |
| 3,091,251 | 5/1963 | Hughey | 137—355.28 |

M. CARY NELSON, *Primary Examiner.*

S. SCOTT, *Assistant Examiner.*

UNITED STATES PATENT OFFICE
CERTIFICATE OF CORRECTION

Patent No. 3,381,705                                                    May 7, 1968

Joseph P. Murphy

It is hereby certified that error appears in the above numbered patent requiring correction and that the said Letters Patent should read as corrected below.

Column 1, between lines 21 and 22, insert

This invention relates to techniques for handling lines of hose or the like, and more particularly to the folding and packaging of sections of such lines to facilitate subsequent transporting, laying and connecting of the line sections.

Although the invention was made during attempts toward improving fire fighting techniques and therefore will be described in connection with the folding and packaging of fire hose, it will be understood that the invention in its broader aspects may have other uses, such as the folding and packaging of garden hose, rope lines or the like so that the same will be more convenient to carry, and susceptible of rapid unfolding, without entanglement, for its intended use.

Modern fire-fighting techniques include the use of an automotive hose truck, usually a pumper truck, for transporting large footage of fire hose to the site of a fire, the fire hose to be ultimately strung between the fire site and a water source which may be a fire hydrant or, more often, the pumper truck itself. Realizing that the hose truck may approach the fire site either directly or from the direction of the hydrant, that the hydrant location may be relatively near to or far from the fire site, and that traffic, parked cars, and other obstacles may prevent rapid and efficient stringing out of the hose in what may be the recommended, theoretically adept manner, there is difficulty and often times dilemma in determining the manner in which the fire hose should be mounted on the hose truck to admit of a number of possible alternatives when laying the hose at the scene of the fire.

Signed and sealed this 16th day of September 1969.

(SEAL)
Attest:

EDWARD M. FLETCHER, JR.                              WILLIAM E. SCHUYLER, J.
Attesting Officer                                                Commissioner of Patent.